(12) United States Patent
Pugh

(10) Patent No.: US 9,949,593 B2
(45) Date of Patent: Apr. 24, 2018

(54) EMBOSSED PAPER-BASED BAKEABLE TRAY

(71) Applicant: Smart Packaging, LLC, Plymouth, MA (US)

(72) Inventor: Jeffrey D. Pugh, Minnetrista, MN (US)

(73) Assignee: Smart Packaging, LLC, Minnetonka, MN (US)

( * ) Notice: Subject to any disclaimer, the term of this patent is extended or adjusted under 35 U.S.C. 154(b) by 0 days.

(21) Appl. No.: 13/832,076

(22) Filed: Mar. 15, 2013

(65) Prior Publication Data

US 2013/0199380 A1 Aug. 8, 2013

Related U.S. Application Data

(63) Continuation-in-part of application No. 13/273,029, filed on Oct. 13, 2011, now Pat. No. 9,744,738.

(51) Int. Cl.
| | | |
|---|---|---|
| *A47J 27/00* | (2006.01) | |
| *A47J 36/02* | (2006.01) | |
| *A47J 36/04* | (2006.01) | |
| *D21H 27/02* | (2006.01) | |

(52) U.S. Cl.
CPC ............ *A47J 36/022* (2013.01); *A47J 36/04* (2013.01); *D21H 27/02* (2013.01)

(58) Field of Classification Search
USPC ... 220/573.1, 573.2, 573.3, 574, 574.3, 608, 220/912
See application file for complete search history.

(56) References Cited

U.S. PATENT DOCUMENTS

| | | | | |
|---|---|---|---|---|
| 4,373,636 | A * | 2/1983 | Hoffman | 206/551 |
| 5,423,477 | A * | 6/1995 | Valdman et al. | 229/104 |
| 5,484,984 | A * | 1/1996 | Gics | 219/734 |
| 5,628,426 | A * | 5/1997 | Doyle et al. | 220/608 |
| 6,097,017 | A * | 8/2000 | Pickford | 219/725 |
| 2004/0115401 | A1 * | 6/2004 | Talja et al. | 428/174 |

* cited by examiner

*Primary Examiner* — Jeffrey Allen
(74) *Attorney, Agent, or Firm* — Thomas J. Oppold; Larkin Hoffman Daly & Lindgren, Ltd.

(57) ABSTRACT

An embossed paper-based bakeable tray having a bottom surface and sidewalls and an embossed pattern formed in the bottom surface providing a series of closely spaced projections substantially entirely over the bottom surface.

9 Claims, 8 Drawing Sheets

EMBOSSED PAPER-BASED BAKEABLE TRAY

This is a continuation-in-part of U.S. patent application Ser. No. 13/273,029 filed Oct. 13, 2011.

BACKGROUND

Paper-based, oven-ready or bakeable trays are well known in the art for baking, heating, or reheating foods. Such paper-based bakeable trays are commonly used by "take-and-bake" pizza companies. Paper-based bakeable trays are also used by makers of frozen pizza, partial baked "par-bake" and raw pizza dough. These paper-based bakeable trays include barrier coatings such that they are impermeable to liquids and can withstand typical oven temperatures. While these trays may serve their intended purpose, it has been found that when foods are baked in these conventional trays, the food may not cook uniformly. For example, when pizza is cooked on these conventional trays, that the pizza crust in the middle of the tray is often soft and doughy. Accordingly there is a need for a paper-based bakeable tray that promotes uniform cooking.

Additionally, conventional paper-based bakeable trays have a flat or substantially flat bottom. When the cooked food is allowed to sit in these flat bottom trays, the food often becomes soggy from condensation or from grease or other juices dripping from the food. Accordingly there is a need for a paper-based bakeable tray that minimizes or prevents the food baked within the tray from becoming soggy due to condensation or from sitting in its own juices while cooking or after cooking.

DESCRIPTION

Figure 1:
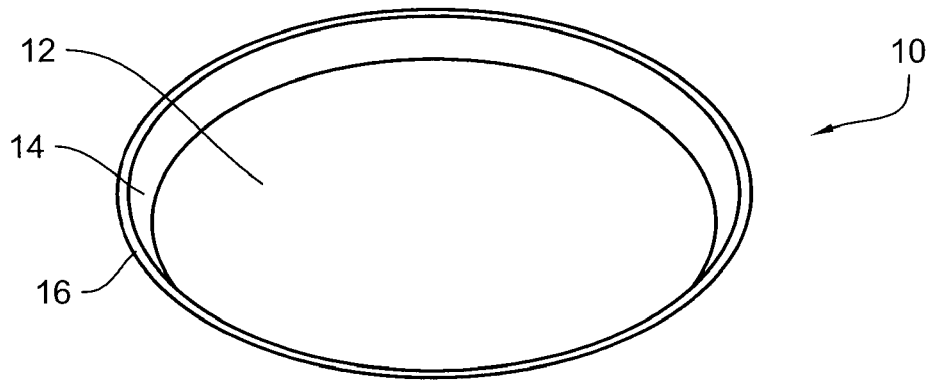
FIG. 1 is a perspective view of one type of conventional paper-based bakeable tray with a flat bottom surface.
Figure 2:
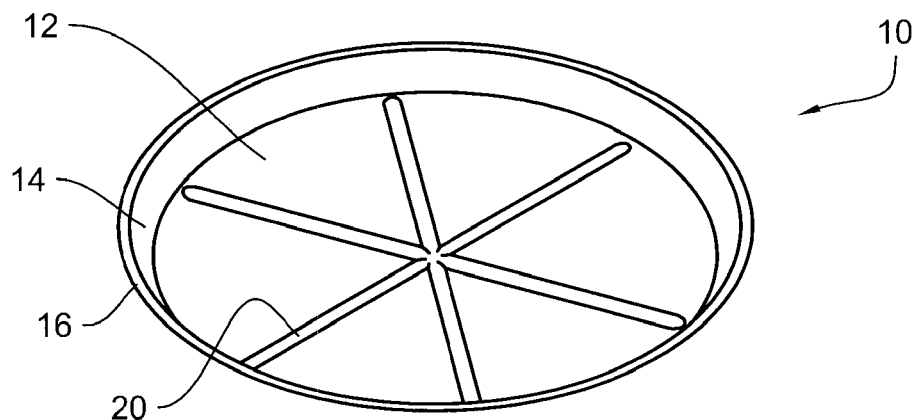
FIG. 2 is a perspective view of another type of conventional paper-based bakeable tray with raised contour surfaces in the form of a pinwheel pattern on the bottom surface of the tray.
Figure 3:
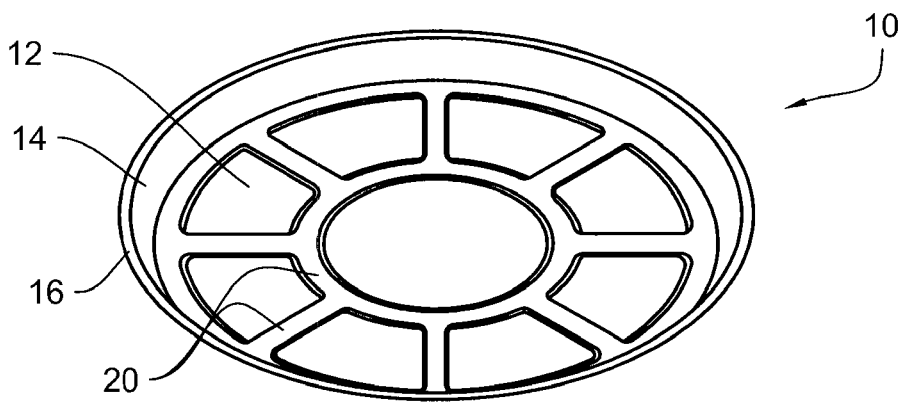
FIG. 3 is a perspective view of yet another type of conventional paper-based bakeable with raised contour surfaces in the form of an octagonal pattern on the bottom surface of the tray.

Referring to the drawings, wherein like reference numerals designate identical or corresponding parts throughout the several views, FIG. 1 illustrates a conventional paper-based bakeable tray 10 having a bottom surface 12 and sidewalls 14. The sidewalls may include a peripheral lip 16. FIG. 2 illustrates a conventional paper-based bakeable tray 10 having raised contour surfaces 20 formed in the bottom surface 12 in the form of a pinwheel pattern. FIG. 3 illustrates a conventional paper-based bakeable tray 10 having raised contour surfaces 20 formed in the bottom surface 12 in the form of a an octagonal pattern. The conventional paper-based trays 10 are typically formed using a thermoforming process. As recognized and understood by those of skill in the art, barrier coatings or barrier materials may be applied to the paper-based material, before, during or after the thermoforming process or otherwise incorporated into the paper-based material such that the trays are impermeable to liquids and/or to withstand typical oven temperatures.

Figure 4:
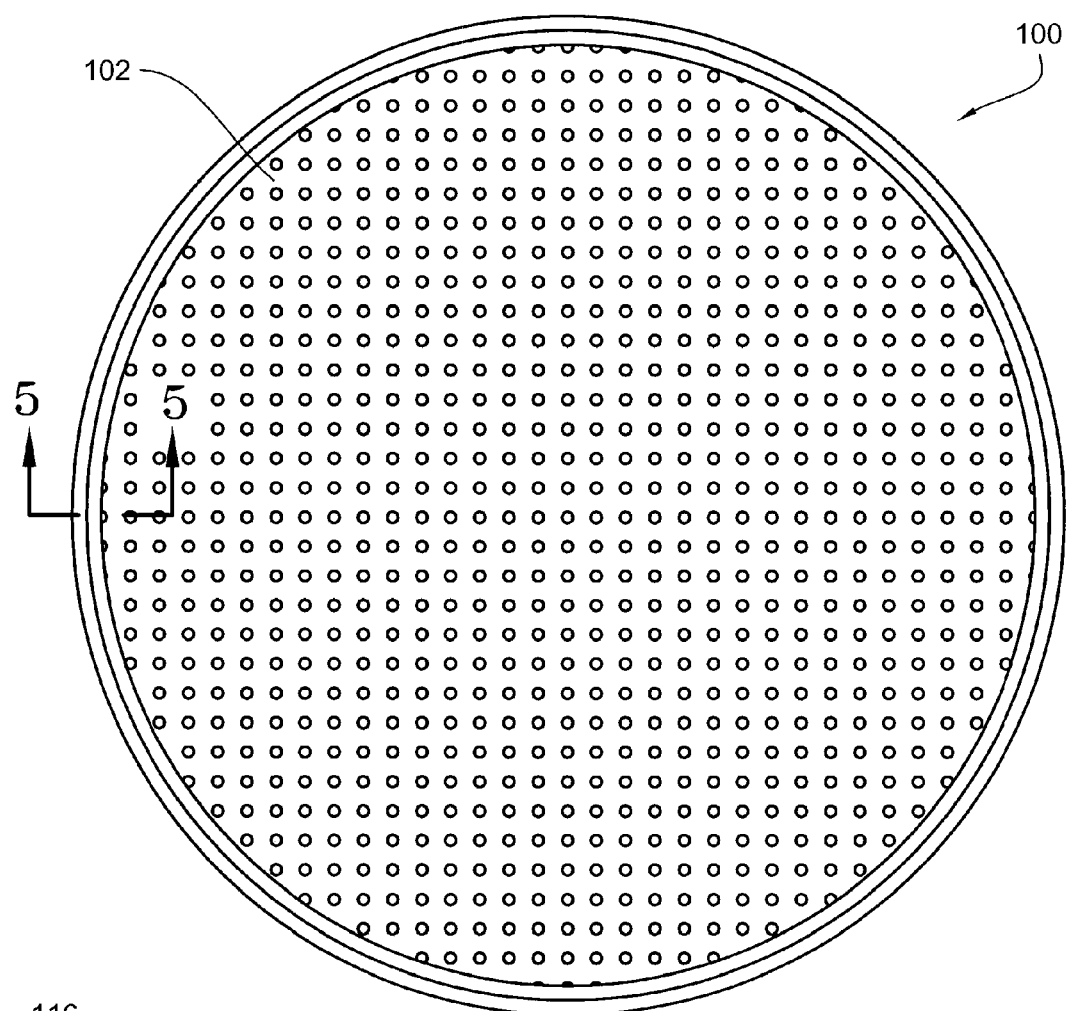
FIG. 4 is a plan view of one embodiment of a paper-based bakeable tray similar to the conventional paper-based bakeable tray of FIG. 1, but with an embossing pattern comprising upward projections on the bottom surface of the tray.
Figure 5:
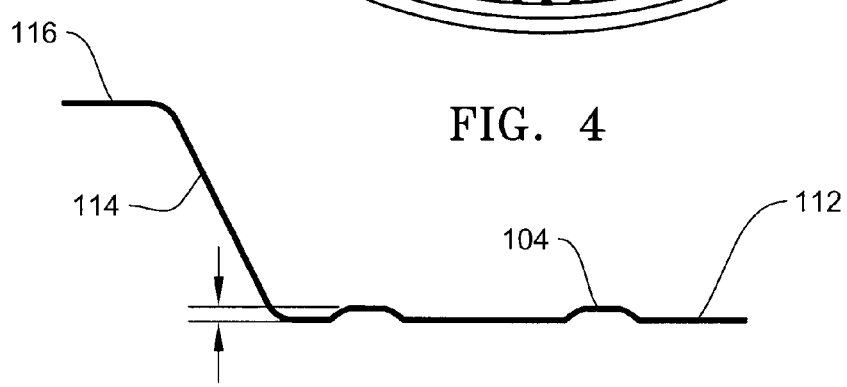
FIG. 5 is a partial cross-sectional view of the embossed paper-based bakeable tray of FIG. 4 as viewed along lines 5-5 of FIG. 4.

FIG. 4 illustrates an embossed paper-based bakeable tray 100 similar to the conventional paper-based bakeable tray 10 of FIG. 1. The embossed paper-based bakeable tray 100 has a bottom surface 112 and sidewalls 114. The sidewalls 114 may include a peripheral lip 116. However, unlike the conventional tray 10, the embossed tray 100 includes an embossed pattern 102 formed in the bottom surface 112 of the tray. FIG. 5 is a partial cross-sectional view of the tray 100 as viewed along lines 5-5 of FIG. 4. As used herein, the term "embossed pattern" should be understood to include any type of stamping, imprinting, pressing or forming process that creates a series of closely spaced intermittent projections as opposed to raised contour surfaces 20 as depicted in FIGS. 2 and 3.

Figure 6:
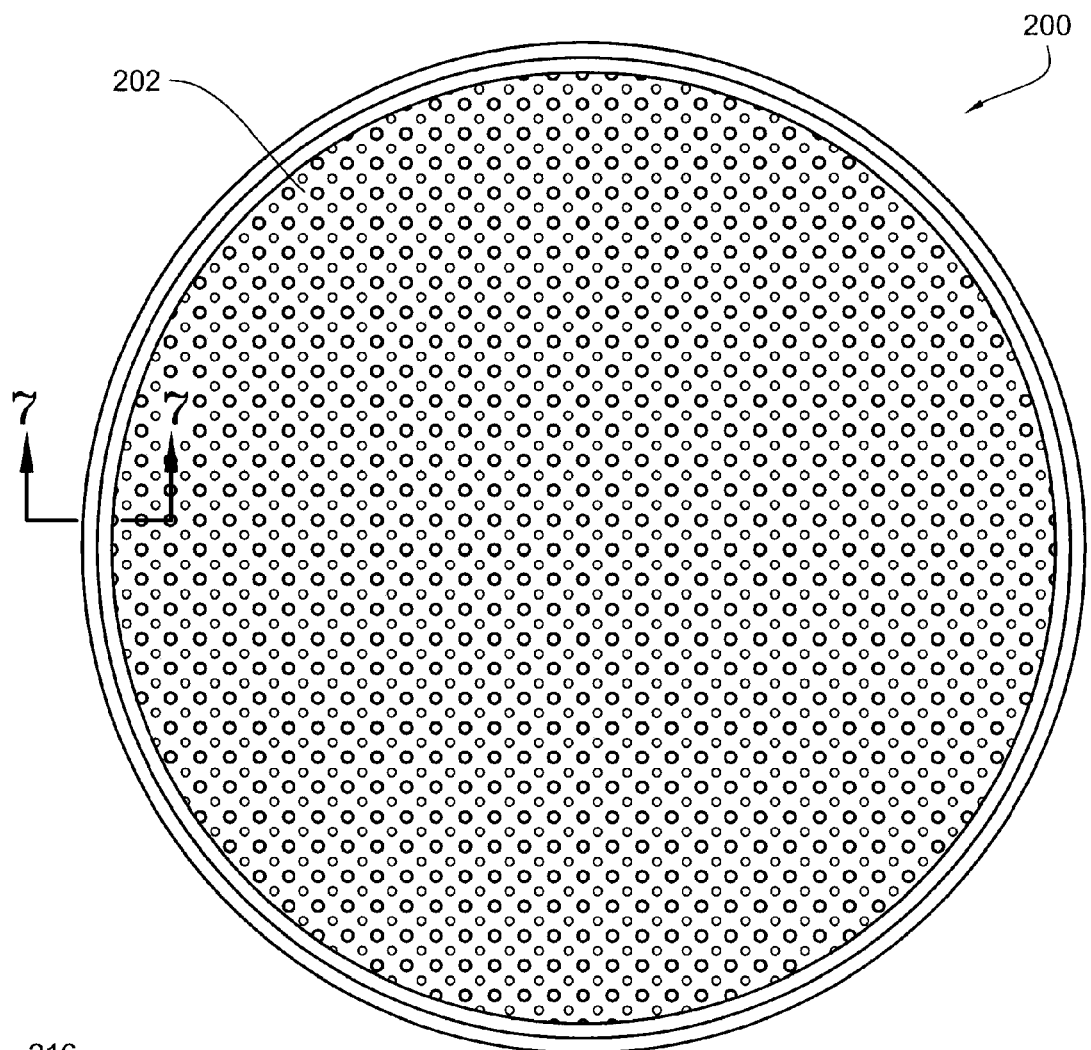
FIG. 6 is a plan view of one embodiment of a paper-based bakeable tray similar to the conventional paper-based bakeable tray of FIG. 1, but with an embossing pattern comprising upward projections and downward depressions on the bottom surface of the tray.
Figure 7:
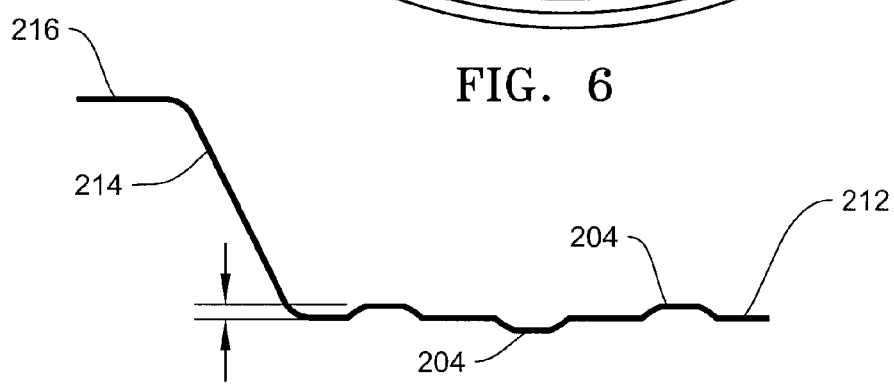
FIG. 7 is a partial cross-sectional view of the embossed paper-based bakeable tray of FIG. 6 as viewed along lines 7-7 of FIG. 6.

FIG. 6 illustrates a an alternative embodiment of an embossed paper-based bakeable tray 200 similar to the conventional paper-based tray 10 of FIG. 1, but with an embossed pattern 202 formed in the bottom surface 212 of the tray and wherein the embossed pattern 202 comprises both upward and downward projections 204. The embossed paper-based bakeable tray 200 has sidewalls 214 which may include a peripheral lip 216. FIG. 7 is a partial cross-sectional view of the embossed tray 200 as viewed along lines 7-7 of FIG. 6 showing the embossing pattern 202 comprising both the upward and downward projections 204.

Figure 8:
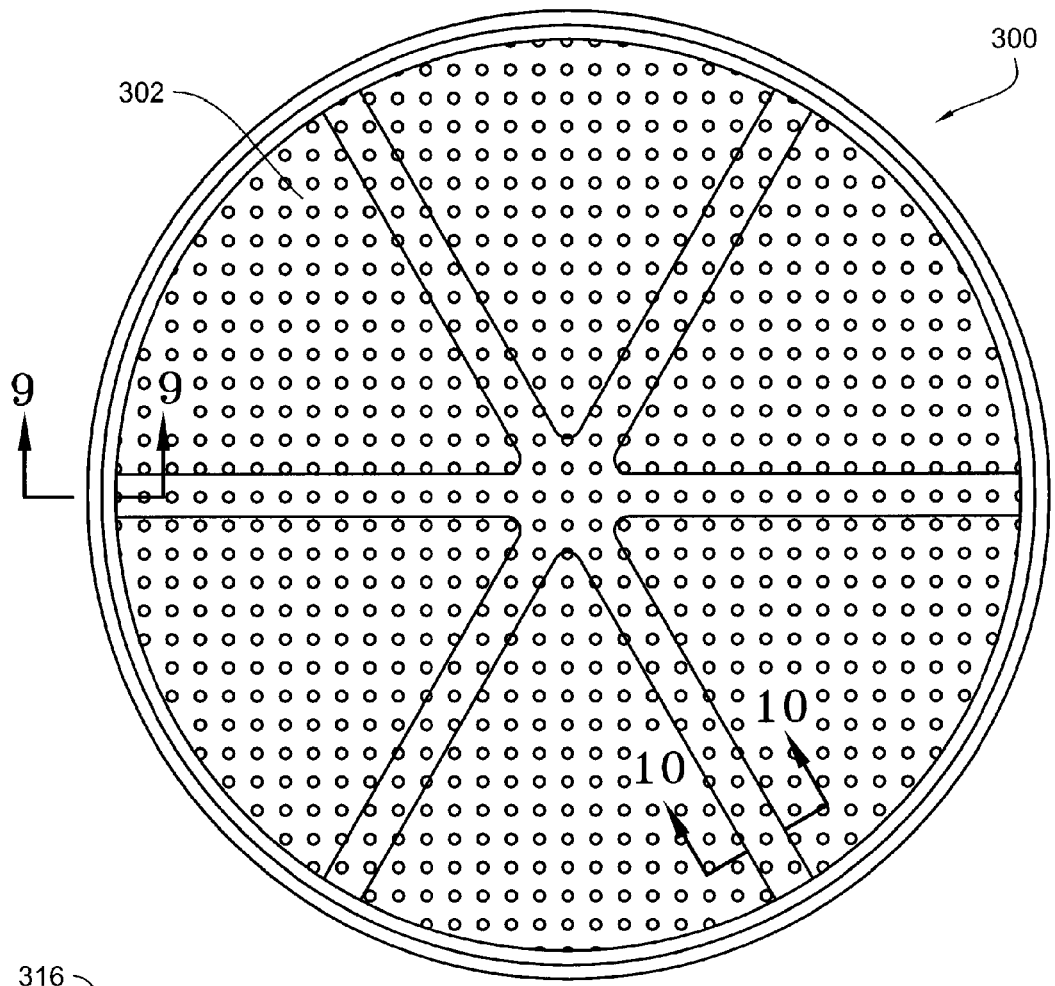
FIG. 8 is a plan view of one embodiment of a paper-based bakeable tray with raised contour surfaces in the form of a pinwheel as in FIG. 2, but with an embossing pattern on one side of the bottom of the tray.
Figure 9:
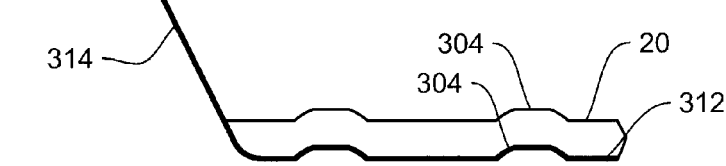
FIG. 9 is a partial cross-sectional view of the embossed paper-based bakeable tray of FIG. 8 as viewed along lines 9-9 of FIG. 8.
Figure 10:
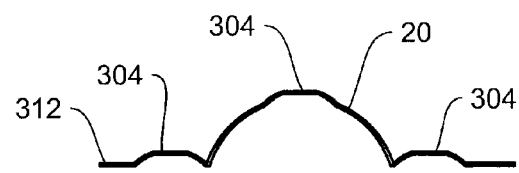
FIG. 10 is a partial cross-sectional view of the embossed paper-based bakeable tray of FIG. 8 as viewed along lines 10-10 of FIG. 8.
Figure 20:
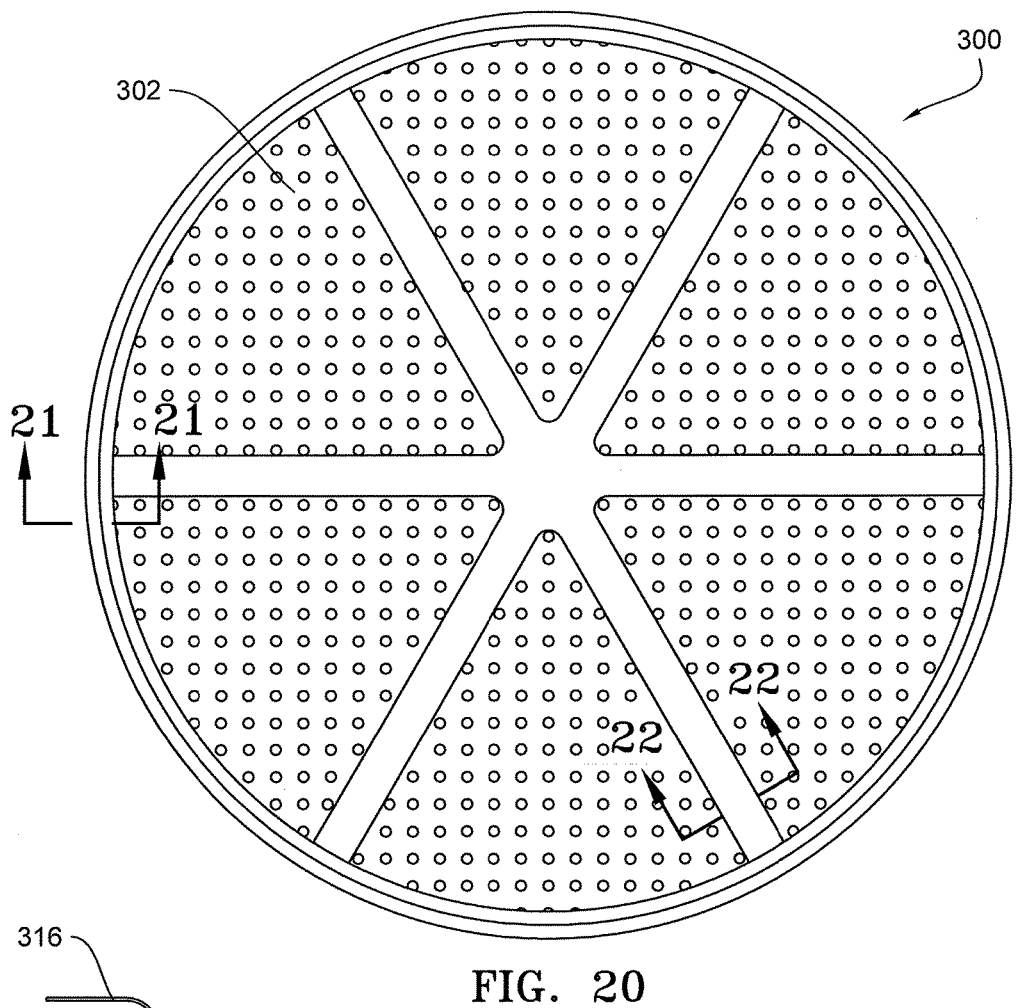
FIG. 20 is a plan view of one embodiment of a paper-based bakeable tray with raised contour surfaces in the form of a pinwheel as in FIG. 8, but with an embossing pattern on one side of the bottom of the tray and located only between the contour surfaces.
Figure 21:
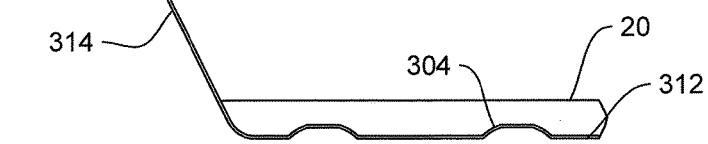
FIG. 21 is a partial cross-sectional view of the embossed paper-based bakeable tray of FIG. 20 as viewed along lines 21-21 of FIG. 20
Figure 22:
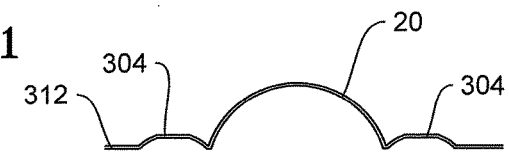
FIG. 22 is a partial cross-sectional view of the embossed paper-based bakeable tray of FIG. 20 as viewed along lines 22-22 of FIG. 20.

FIG. 8 illustrates a an alternative embodiment of an embossed paper-based bakeable tray 300 similar to the conventional paper-based tray 10 of FIG. 2 having raised contour surfaces 20 in the form of a pinwheel, but with an embossed pattern 302 formed in the bottom surface 312 of the tray and wherein the embossed pattern 302 comprises upward projections 304. The embossed paper-based bakeable tray 300 has sidewalls 314 which may include a peripheral lip 316. FIG. 9 is a partial cross-sectional view of the embossed tray 300 as viewed along lines 9-9 of FIG. 8. FIG. 10 is a partial cross-sectional view of the embossed tray 300 as viewed along lines 10-10 of FIG. 8 illustrating the cross-sectional view of one of the raised contour surfaces 20 of the pinwheel pattern. As illustrated, the raised contour surfaces 20 of the pinwheel pattern include the embossed pattern 302, but it should be appreciated that, if desired, the embossed pattern 302 may only be provided between the raised contour surfaces 20. An embodiment of this configuration with the embossed pattern 302 existing only between the raised contour surfaces 20 is illustrated in FIG. 20. Similarly, a cross-sectional view is illustrated in FIG. 21, as viewed along lines 21-21 of FIG. 20.

Figure 11:
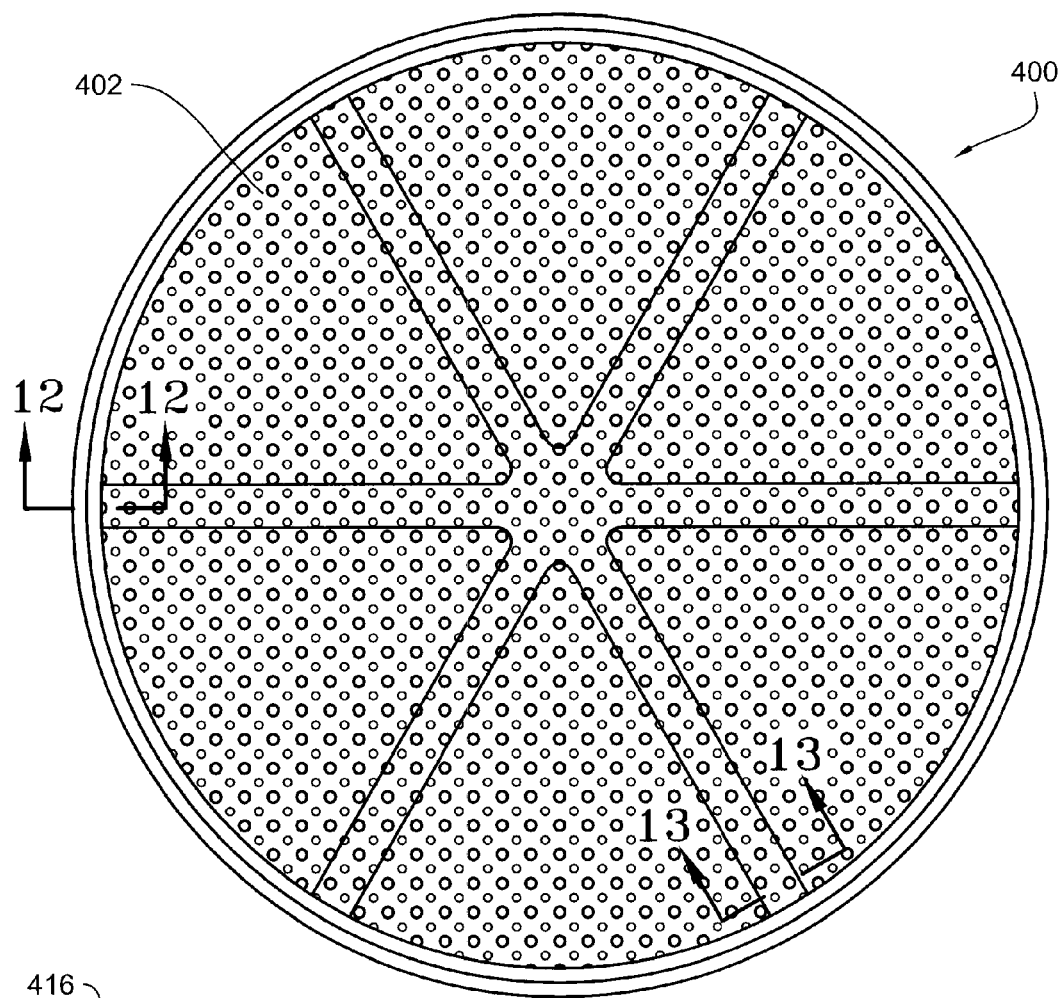
FIG. 11 is a plan view of one embodiment of a paper-based bakeable tray with raised contour surfaces in the form of a pinwheel as in FIG. 2, but with an embossing pattern comprising upward projections and downward depressions on the bottom surface of the tray.
Figure 12:
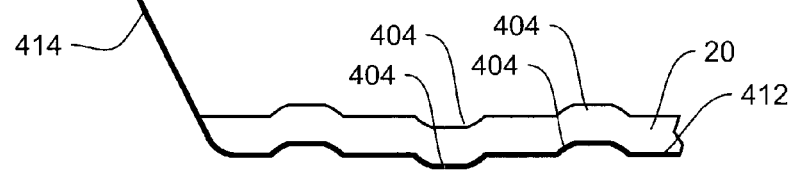
FIG. 12 is a partial cross-sectional view of the embossed paper-based bakeable tray of FIG. 11 as viewed along lines 12-12 of FIG. 11.
Figure 13:
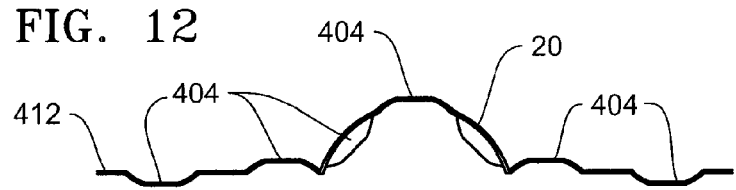
FIG. 13 is a partial cross-sectional view of the embossed paper-based bakeable tray of FIG. 11 as viewed along lines 13-13 of FIG. 11.

FIG. 11 illustrates a an alternative embodiment of an embossed paper-based bakeable tray 400 similar to the conventional paper-based tray 10 of FIG. 2 having raised contour surfaces 20 in the form of a pinwheel, but with an embossed pattern 402 formed in the bottom surface 412 of the tray and wherein the embossed pattern 402 comprises both upward and downward projections 404. The embossed paper-based bakeable tray 400 has sidewalls 414 which may include a peripheral lip 416. FIG. 12 is a partial cross-sectional view of the embossed tray 400 as viewed along lines 12-12 of FIG. 11. FIG. 13 is a partial cross-sectional view of the embossed tray 400 as viewed along lines 13-13 of FIG. 11 illustrating the cross-sectional view of one of the raised contour surfaces 20 of the pinwheel pattern. As illustrated, the raised contour surfaces 20 of the pinwheel pattern include the embossed pattern 402, but it should be appreciated that, if desired, the embossed pattern 402 may only be provided between the raised contour surfaces 20.

Figure 14:
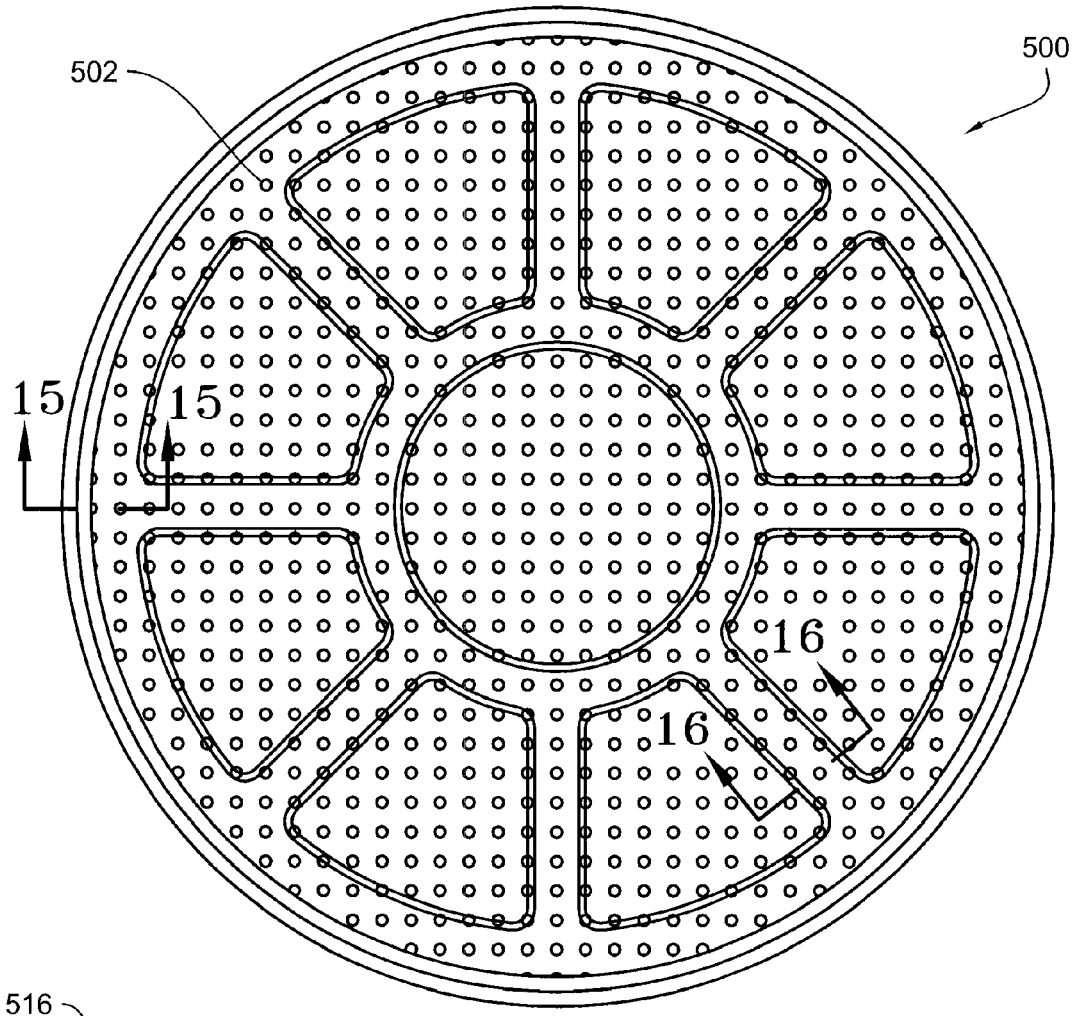
FIG. 14 is a plan view of one embodiment of a paper-based bakeable tray with raised contour surfaces in the form of an octagonal pattern as in FIG. 3, but with an embossing pattern on one side of the bottom of the tray.
Figure 15:
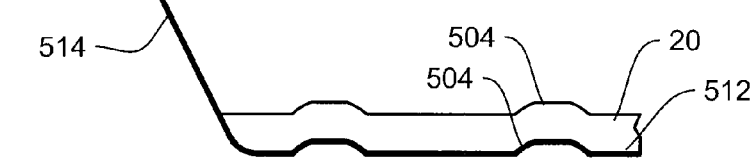
FIG. 15 is a partial cross-sectional view of the embossed paper-based bakeable tray of FIG. 14 as viewed along lines 15-15 of FIG. 14.
Figure 16:
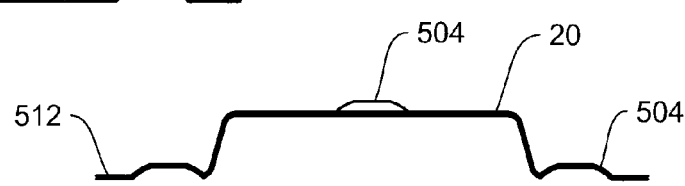
FIG. 16 is a partial cross-sectional view of the embossed paper-based bakeable tray of FIG. 14 as viewed along lines 16-16 of FIG. 14.

FIG. 14 illustrates a an alternative embodiment of an embossed paper-based bakeable tray 500 similar to the conventional paper-based tray 10 of FIG. 3 having raised contour surfaces 20 in the form of an octagonal pattern, but with an embossed pattern 502 formed in the bottom surface 512 of the tray and wherein the embossed pattern 502 comprises upward projections 504. The embossed paper-based bakeable tray 500 has sidewalls 514 which may include a peripheral lip 516. FIG. 15 is a partial cross-sectional view of the embossed tray 500 as viewed along lines 15-15 of FIG. 14. FIG. 16 is a partial cross-sectional view of the embossed tray 500 as viewed along lines 16-16 of FIG. 14 illustrating the cross-sectional view of one of the raised contour surfaces 20 of the octagonal pattern. As illustrated, the raised contour surface 20 of the octagonal pattern includes the embossed pattern 502, but it should be appreciated that, if desired, the embossed pattern 502 may only be provided between the raised contour surfaces 20.

Figure 17:
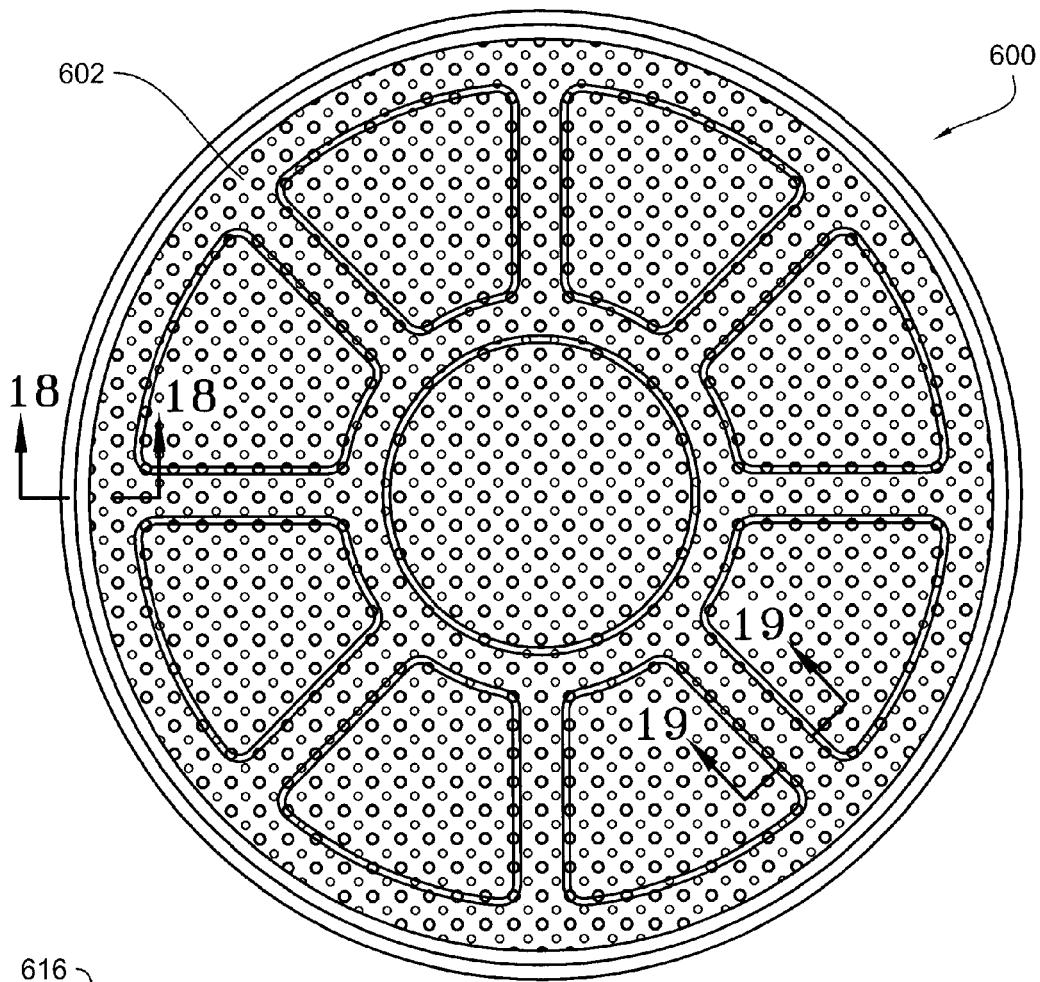
FIG. 17 is a plan view of one embodiment of a paper-based bakeable tray with raised contour surfaces in the form of an octagonal pattern as in FIG. 3, but with an embossing pattern comprising upward projections and downward depressions on the bottom surface of the tray.
Figure 18:
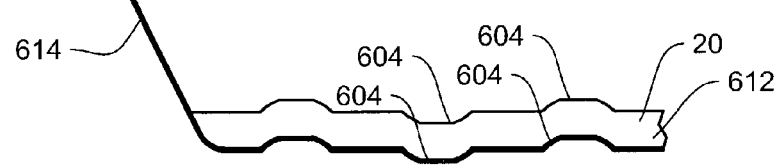
FIG. 18 is a partial cross-sectional view of the embossed paper-based bakeable tray of FIG. 17 as viewed along lines 18-18 of FIG. 17.
Figure 19:
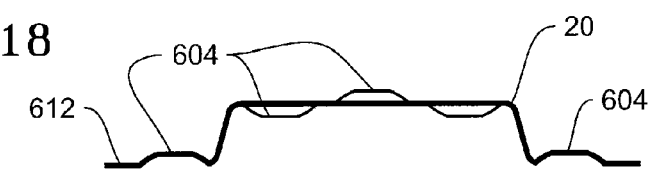
FIG. 19 is a partial cross-sectional view of the embossed paper-based bakeable tray of FIG. 17 as viewed along lines 19-19 of FIG. 17.

FIG. 17 illustrates a an alternative embodiment of an embossed paper-based bakeable tray 600 similar to the conventional paper-based tray 10 of FIG. 3 having raised contour surfaces 20 in the form of an octagonal pattern, but with an embossed pattern 602 formed in the bottom surface 612 of the tray and wherein the embossing pattern 602 comprises both upward and downward projections 604. The embossed paper-based bakeable tray 600 has sidewalls 614 which may include a peripheral lip 616. FIG. 18 is a partial cross-sectional view of the embossed tray 600 as viewed along lines 18-18 of FIG. 17. FIG. 19 is a partial cross-sectional view of the embossed tray 600 as viewed along lines 19-19 of FIG. 17 illustrating the cross-sectional view of one of the raised contour surfaces 20 of the octagonal pattern. As illustrated, the raised contour surface 20 of the octagonal pattern includes the embossed pattern 602, but it should be appreciated that, if desired, the embossed pattern 602 may only be provided between the raised contour surfaces 20.

Each of the embossed paper-based bakeable trays 100, 200, 300, 400, 500, 600 may be formed in the same manner using the same type of thermoforming press used to produce conventional paperboard trays 10 but with the desired embossing pattern formed in the face of the male and/or female dies used in the thermoforming press. The embossed trays may be used for a number of purposes and may take any desired shape. For example, rather than being a circular tray as shown, the tray may be rectangular or triangular or it may take the shape of the food product.

The embossing patterns 102, 202, 302, 402, 502, 602 comprises a series of closely spaced projections 104, 204, 304, 404, 504, 604 formed into the bottom surface 112, 212, 312, 412, 512, 612 of the paper-based embossed trays 100, 200, 300, 400, 500, 600. The projections may be any suitable configuration, size and spacing. As an example, the projections may have a diameter of about 3/16 inch, and a height range between about 0.010 to about 0.040 inches, with a center-to-center spacing of about ½ inch. It should be appreciated, however, that the projections need not be round or circular and may have any desired size or shape, including any polygonal shape with widths and lengths or diameters between about ⅛ inch to about 1 inch, and may be spaced at distances ranging from about ⅜ inch to about 2 inches depending on the size of the projections.

The projections 104, 204, 304, 404, 504, 604 serve to intermittently support the food product thereby allowing air circulation below the food product so the food does not become soggy due to the collection of condensation, drippings or juices from the food as it is being cooked or after cooking. The projections also provide an air space which minimizes heat transfer via conduction thereby keeping the food warmer for a longer period of time. With the embossed trays having both upward and downward projections, the downward projections or depressions may permit additional air circulation and serve as small wells in which condensation, food juices or drippings are collected.

It has been found that paper-based bakeable trays having an embossing patterns as described herein improves the quality of certain foods when reheating or baking, due to the projections creating an air space and allowing more air circulation below the food. For example it has been found that if a conventional flat (non-embossed) paper-based bakeable tray having a flat bottom surface as in FIG. 1 is formed with an embossing pattern as described herein, and if this embossed trays are then used to bake pizza, the resulting crust is more uniformly cooked, is crispier and has a more uniform golden-brown crust. It was also found that if a black colored, conventional flat (non-embossed) paper based bakeable tray such as illustrated in FIG. 1 is formed with an embossing pattern as described herein so as to create a black embossed paperboard tray, the resulting crust is even crispier and more golden-brown.

The embossed trays 100, 200, 300, 400, 500, 600 may be made of premium grade solid bleached sulfate (SBS) or any other suitable type of paper, paperboard, cardstock or cardboard material or any other type of pulp-based, fiber-based or cellulose-based material, whether from wood, other plant or natural material or from synthetic material.

Depending on the application and intended use of the embossed trays 100, 200, 300, 400, 500, 600 and the type of food it is intended to contact, the embossed trays may include appropriate barrier coatings as well known to those of skill in the art such that the embossed trays are suitable for baking, heating, or reheating foods. Additionally, or in the alternative, the embossed trays may include barrier coatings such that the embossed trays are freezer-to-oven ready and/or impermeable to liquids.

The foregoing description is presented to enable one of ordinary skill in the art to make and use the invention and is provided in the context of a patent application and its requirements. Various modifications to the embodiments of the apparatus and the general principles and features described herein will be readily apparent to those of skill in the art. Thus, the present invention is not to be limited to the embodiments described above and illustrated in the drawing figures, but is to be accorded the widest scope consistent with the spirit and scope of the appended claims.

The invention claimed is:

1. An embossed paper-based bakeable tray for baking a food product, comprising:
    a thermoformed paper-based bakeable tray having a bottom area and sidewalls extending upwardly from said bottom area, wherein said bottom area is situated in a plane extending from and connected to a bottom edge of the sidewalls;
    an embossed pattern formed in said bottom area, said bottom area having an upper surface and a lower surface, said embossed pattern comprising a plurality of upper projections extending generally upwardly from said upper surface and said embossed pattern comprising a plurality of lower projections extending generally downwardly from said lower surface, each of said plurality of upper projections being circular and extending about 0.01 to about 0.04 inches above said upper surface of said bottom area and having a planar upper projection surface, wherein said upper projection surfaces form an intermittent upper support surface, and each of said plurality of lower projections being circular and extending about 0.01 inches to about 0.04 inches below said lower surface of the bottom area and having a planar lower projection surface, wherein said lower projection surfaces form an intermittent lower support surface, and wherein each lower projection forms a reservoir configured to collect liquid, and wherein said intermittent upper support surface is adapted to support a food product placed thereon while also providing an open space under the food product, and wherein said intermittent lower support surface provides an open space that allows for air circulation below said lower surface and a support surface on which said tray is placed.

2. The embossed paper-based bakeable tray of claim 1 wherein said bottom area of said tray includes raised contour surfaces and wherein said embossed pattern is formed in said raised contour surfaces and between said raised contour surfaces.

3. The embossed paper-based bakeable tray of claim 1 wherein said bottom area of said tray includes raised contour surfaces and wherein said embossed pattern is formed only between said raised contour surfaces.

4. The embossed paper-based bakeable tray of claim 2 wherein said raised contour surfaces are in the shape of a pinwheel pattern.

5. The embossed paper-based bakeable tray of claim 2 wherein said raised contour surfaces are in the shape of an octagonal pattern.

6. The embossed paper-based bakeable tray of claim 3 wherein said raised contour surfaces are in the shape of a pinwheel pattern.

7. The embossed paper-based bakeable tray of claim 3 wherein said raised contour surfaces are in the shape of an octagonal pattern.

8. The embossed paper-based bakeable tray of claim 1 wherein said thermoformed paper-based bakeable tray has a thermal conductivity between about 0.01 $W \cdot m^{-1} \cdot K^{-1}$ to about 2.0 $W \cdot m^{-1} \cdot K^{-1}$.

9. The embossed paper-based bakeable tray of claim 8 wherein said baking occurs at a temperature between about 150 degrees Fahrenheit and about 500 degrees Fahrenheit.

\* \* \* \* \*